(12) United States Patent
Hand et al.

(10) Patent No.: US 9,770,864 B2
(45) Date of Patent: Sep. 26, 2017

(54) METHODS OF INTERNALLY INSULATING A FLUTED CORE SANDWICH STRUCTURE

(71) Applicant: The Boeing Company, Chicago, IL (US)

(72) Inventors: Michael L. Hand, Huntington Beach, CA (US); Juan C. Guzman, Seattle, WA (US); Douglas A. McCarville, Bonney Lake, WA (US); Jeffrey D. Eichinger, Fountain Valley, CA (US); Keith Chong, Placentia, CA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 14/735,809

(22) Filed: Jun. 10, 2015

(65) Prior Publication Data
US 2016/0361866 A1 Dec. 15, 2016

(51) Int. Cl.
B29C 65/00 (2006.01)
B29C 70/44 (2006.01)
(Continued)

(52) U.S. Cl.
CPC .......... B29C 66/301 (2013.01); B29C 33/505 (2013.01); B29C 44/186 (2013.01);
(Continued)

(58) Field of Classification Search
CPC .... F17C 1/12; F17C 2209/238; F17C 13/001; B29L 2031/7156; B29L 2024/003; B29L 2024/006; B29L 2031/3076; B29L 2031/3082; B29L 2031/3085; F16J 12/00; B64G 1/402; B64D 37/06; B29C 70/446; B64C 3/34; B29D 99/001; B29D 99/0014;
(Continued)

(56) References Cited

U.S. PATENT DOCUMENTS 6,743,504 B1 * 6/2004 Allen .................... B29C 70/446
428/188
7,296,769 B2 11/2007 Hogenson et al.
(Continued)

FOREIGN PATENT DOCUMENTS

WO 2012101439 8/2012

OTHER PUBLICATIONS

Extended European Search Report for EP Application No. 16161455.7 dated Oct. 21, 2016.

Primary Examiner — Carson Gross
(74) Attorney, Agent, or Firm — Kunzler Law Group, PC

(57) ABSTRACT

A method of partially insulating an interior space of a pre-formed fluted core panel is disclosed herein. The fluted core panel includes a first facesheet, a second facesheet spaced apart from the first facesheet, and webs between the first facesheet and second facesheet. The interior space is defined between the first facesheet, the second facesheet, and adjacent webs. The method includes positioning a spacer in a first portion of the interior space, positioning a membrane between the spacer and a second portion of the interior space, and positioning insulation in the second portion of the interior space. Additionally, the method includes pressing the membrane against the spacer, curing the membrane, and removing the spacer from the first portion of the interior space.

20 Claims, 9 Drawing Sheets

(51) Int. Cl.

| | |
|---|---|
| *B29C 70/86* | (2006.01) |
| *B29D 24/00* | (2006.01) |
| *B29C 33/50* | (2006.01) |
| *B29D 99/00* | (2010.01) |
| *B29C 44/18* | (2006.01) |
| *F17C 1/12* | (2006.01) |
| *E04B 1/76* | (2006.01) |
| *B64C 3/34* | (2006.01) |
| *F16J 12/00* | (2006.01) |
| *F17C 13/00* | (2006.01) |
| *B64D 37/06* | (2006.01) |
| *B64G 1/40* | (2006.01) |
| *B29L 24/00* | (2006.01) |
| *B29L 31/00* | (2006.01) |
| *B29K 75/00* | (2006.01) |
| *B29K 105/04* | (2006.01) |
| *B29L 7/00* | (2006.01) |
| *B29L 9/00* | (2006.01) |

(52) U.S. Cl.
CPC .......... *B29C 66/005* (2013.01); *B29C 66/532* (2013.01); *B29C 66/61* (2013.01); *B29C 66/72523* (2013.01); *B29C 66/81455* (2013.01); *B29C 70/446* (2013.01); *B29C 70/865* (2013.01); *B29D 24/004* (2013.01); *B29D 99/0017* (2013.01); *B29K 2075/00* (2013.01); *B29K 2105/04* (2013.01); *B29K 2715/003* (2013.01); *B29K 2995/0015* (2013.01); *B29L 2007/002* (2013.01); *B29L 2009/00* (2013.01); *B29L 2024/006* (2013.01); *B29L 2031/7156* (2013.01); *B64C 3/34* (2013.01); *B64D 37/06* (2013.01); *B64G 1/402* (2013.01); *E04B 1/7612* (2013.01); *F16J 12/00* (2013.01); *F17C 1/12* (2013.01); *F17C 13/001* (2013.01); *F17C 2209/238* (2013.01)

(58) Field of Classification Search
CPC . E04B 1/7612; E04B 2002/0289; E04C 2/296
USPC .......................................................... 156/293
See application file for complete search history.

(56) References Cited

U.S. PATENT DOCUMENTS

| | | | |
|---|---|---|---|
| 7,998,299 | B2 | 8/2011 | McCarville et al. |
| 8,815,038 | B2 | 8/2014 | McCarville et al. |
| 8,834,667 | B2 | 9/2014 | McCarville et al. |
| 2004/0134162 | A1 | 7/2004 | Douglas |
| 2011/0308711 | A1* | 12/2011 | Coleman ............... B29C 33/448 156/189 |
| 2013/0316147 | A1* | 11/2013 | Douglas ................. B64C 3/182 428/172 |
| 2014/0318705 | A1* | 10/2014 | McCarville ............ B29C 70/30 156/307.1 |
| 2014/0363595 | A1 | 12/2014 | McCarville et al. |
| 2016/0059970 | A1 | 3/2016 | Embler et al. |

* cited by examiner

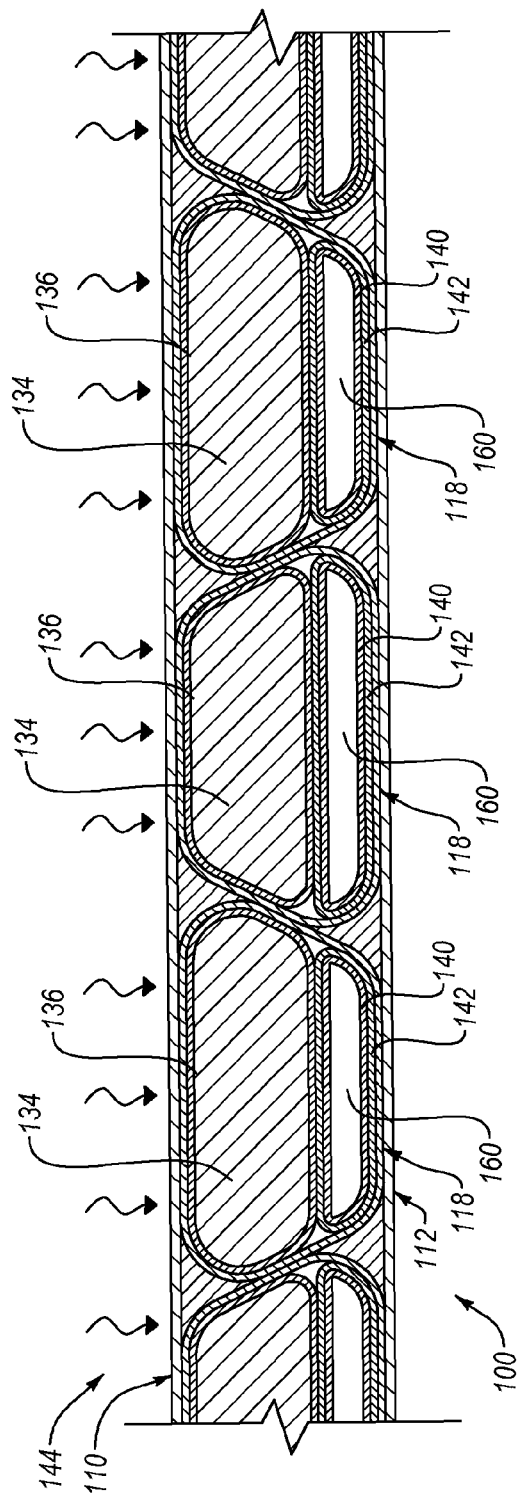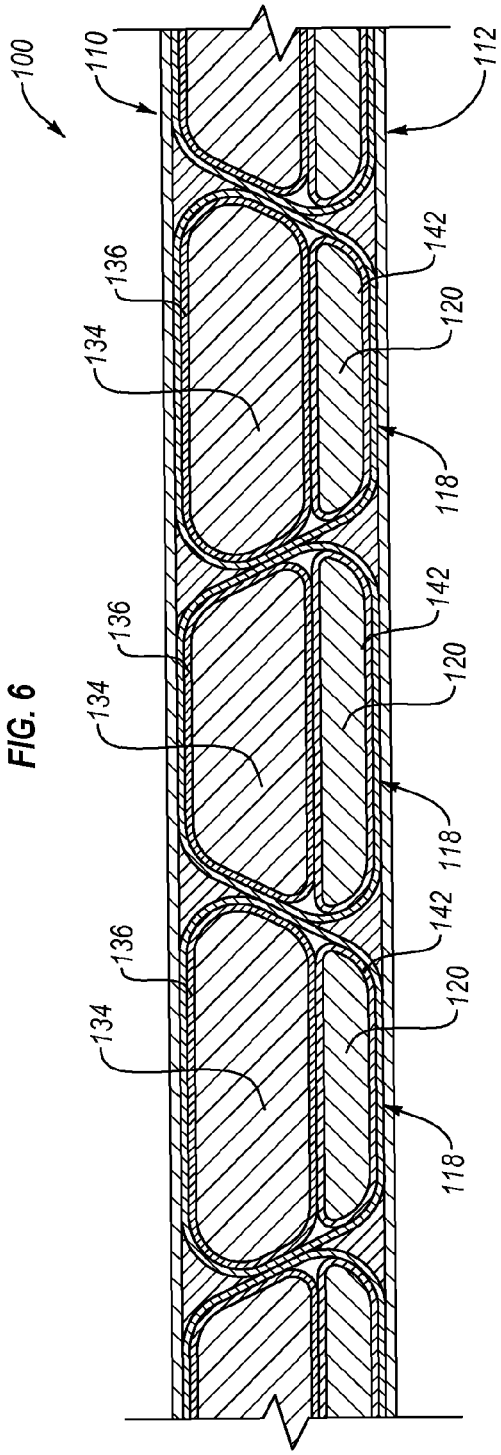

METHODS OF INTERNALLY INSULATING A FLUTED CORE SANDWICH STRUCTURE

FIELD

This disclosure relates generally to fluted core panels, and more particularly to insulating fluted core panels of pressurized components, such as pressure vessels.

BACKGROUND

Some pressurized components, such as pressure vessels or tanks, require insulation to reduce the flow of heat through the components. Certain pressurized components are made from partially-hollow panels, such as fluted core panels. Structural performance of some pressurized components, including the material contained within the components, depends on insulation being positioned within the partially-hollow panels forming the components, which can be difficult to do with conventional manufacturing methods.

SUMMARY

The subject matter of the present application has been developed in response to the present state of the art, and in particular, in response to the problems and needs associated with insulating partially hollow panels, such as fluted core panels. In general, the subject matter of the present application has been developed to provide methods of insulating and making a fluted core panel that overcome at least some of the above-discussed shortcomings of the prior art.

According to some embodiments, a first method of partially insulating an interior space of a pre-formed fluted core panel is disclosed herein. The fluted core panel includes a first facesheet, a second facesheet spaced apart from the first facesheet, and webs between the first facesheet and second facesheet. The interior space is defined between the first facesheet, the second facesheet, and adjacent webs. The first method includes positioning a spacer in a first portion of the interior space, positioning a membrane between the spacer and a second portion of the interior space, and positioning insulation in the second portion of the interior space. Additionally, the first method includes pressing the membrane against the spacer, curing the membrane, and removing the spacer from the first portion of the interior space. The membrane can be cured while the membrane is pressed against the spacer.

In one example, the first method further includes positioning an inflatable bladder in the interior space, where pressing the membrane against the spacer includes inflating the inflatable bladder. The spacer can include a mandrel. The first method may further include wrapping the mandrel with the membrane. Additionally, the first method can include removing the inflatable bladder from the interior space, where positioning insulation in the second portion of the interior space includes injecting insulation into the second portion of the interior space after the inflatable bladder is removed from the interior space, after the membrane is cured, and before the solid mandrel is removed.

According to another example, the first method also includes wrapping the inflatable bladder with an adhesion enhancer, where curing the membrane includes curing the adhesion enhancer. The adhesion enhancer can include glass fibers suspended in a matrix.

In a further example of the first method, the spacer includes the inflatable bladder. The first method can further include wrapping the insulation with the membrane. The insulation can be wrapped by the membrane before the membrane is positioned between the spacer and the second portion of the interior space and before the insulation is positioned in the second portion of the interior space. The insulation may be hardened before enveloping the insulation with the membrane and before positioning the insulation in the second portion of the interior space. The first method may also include applying an adhesive layer onto the membrane. Pressing the membrane against the spacer can include inflating the inflatable bladder.

In one example, the membrane is made from a semi-permeable material. Curing the membrane can bond the membrane to the insulation.

According to some embodiments, a second method of partially insulating interior spaces of a pre-formed fluted core panel is defined herein. The fluted core panel includes a first facesheet, a second facesheet spaced apart from the first facesheet, and webs between the first facesheet and second facesheet. The interior spaces are defined between the first facesheet, the second facesheet, and respective adjacent webs. The method includes positioning one of a plurality spacers in a first portion of each of the interior spaces, positioning one of a plurality of membranes between the spacer and a second portion of each of the interior spaces, and positioning insulation in the second portion of each of the interior spaces. The second method further includes concurrently pressing the membranes against the spacers, concurrently curing the membranes, and removing the spacers from the first portions of the interior spaces.

In one example, the second method also includes positioning one of a plurality of inflatable bladders in each of the interior spaces. Concurrently pressing the membranes against the spacers may include concurrently inflating the inflatable bladders using a single plenum.

According to an example of the second method, the insulation in the second portions of the interior spaces have the same uniform thickness.

In yet some embodiments, a third method of making a fluted core panel includes positioning annular flutes between a first facesheet and a second facesheet. Each annular flute includes opposing first sidewalls and opposing second sidewalls. Additionally, each annular flute includes an interior space defined between the opposing first sidewalls and opposing second sidewalls of the annular flute. Also, each first sidewall abuts a first sidewall of an adjacent flute to form a web that extends between the first facesheet and the second facesheet. Each second sidewall abuts one of the first facesheet and the second facesheet. The third method further includes curing the annular flutes, first facesheet, and second facesheet to form an uninsulated fluted core panel. Additionally, the third method includes positioning a spacer in a first portion of the interior space of at least one annular flute, positioning a membrane between the spacer and a second portion of the interior space of the at least one annular flute, and positioning insulation in the second portion of the interior space of the at least one annular flute. The third method also includes pressing the membrane against the spacer, curing the membrane, and removing the spacer from the first portion of the interior space of the at least one annular flute.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 6 is a cross-sectional side elevation view of the fluted core panel of FIG. 5 shown with an inflatable bladder and an adhesion enhancer positioned in the interior space of the fluted core panel, according to one embodiment;

FIG. 7 is a cross-sectional side elevation view of the fluted core panel of FIG. 6 shown with the inflatable bladder removed from and insulation positioned in the interior space of the fluted core panel, according to one embodiment;

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
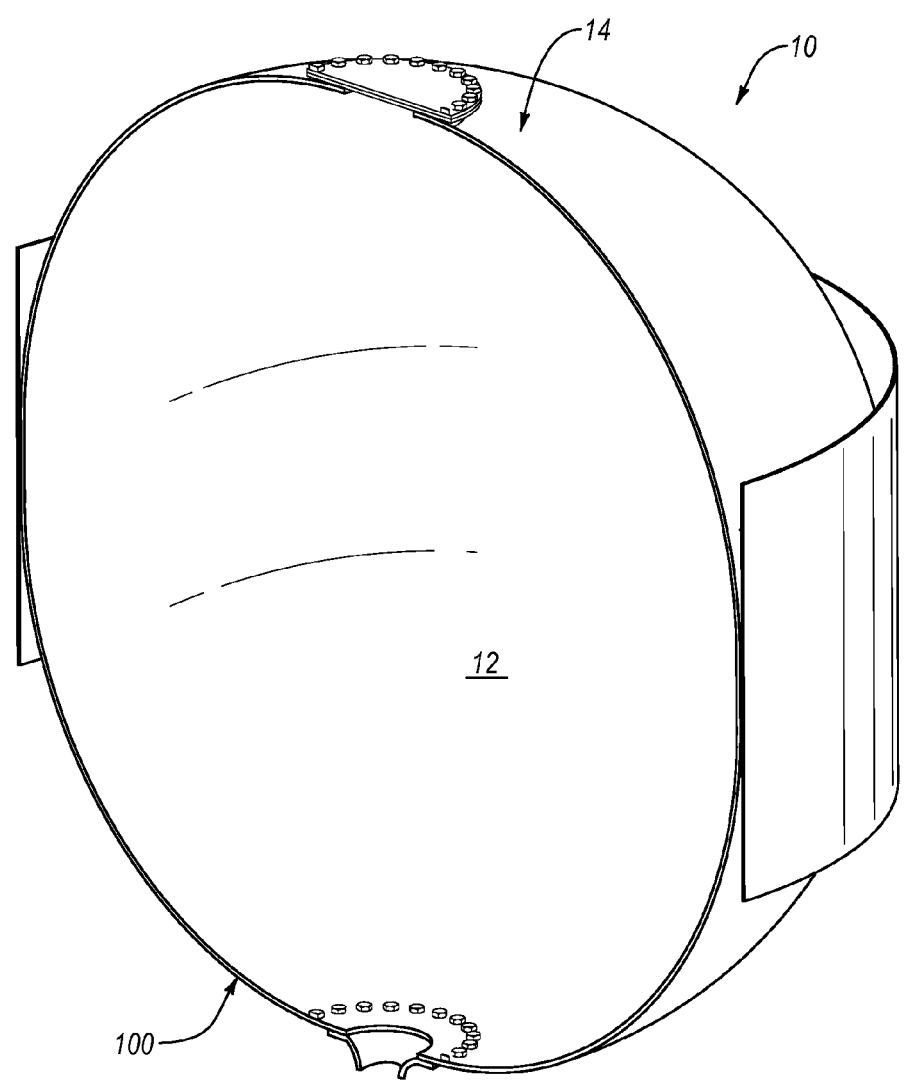
FIG. 1 is a cross-sectional perspective view of a pressure vessel, according to one embodiment.

Referring to FIG. 1, a pressure vessel 10 according to one embodiment is shown. The pressure vessel 10 can be any of various types of pressure vessels for containing pressurized material known in the art. According to the illustrated implementation, the pressure vessel 10 is a cryogenic liquid storage tank for containing a cryogenic liquid. More specifically, the pressure vessel 10 can be a cylindrically-shaped or conically-shaped pressure vessel for containing cryogenic propellants for a vehicle, such as a rocket or other space vehicle. The pressure vessel 10 includes a shell 14 that defines an interior 12 of the pressure vessel in which a pressurized material is stored. The shell 14 is made from a fluted core panel 100, as will be described in more detail below. Generally, the sandwich construction of the fluted core panel 100 provides for a structurally efficient method of making the shell of pressure vessels, particularly those pressure vessels that carry compressive loads during operation. Additionally, the fluted core of the fluted core panel 100 provides means for purging and venting the enclosed spaces within the fluted core.

Figure 2:
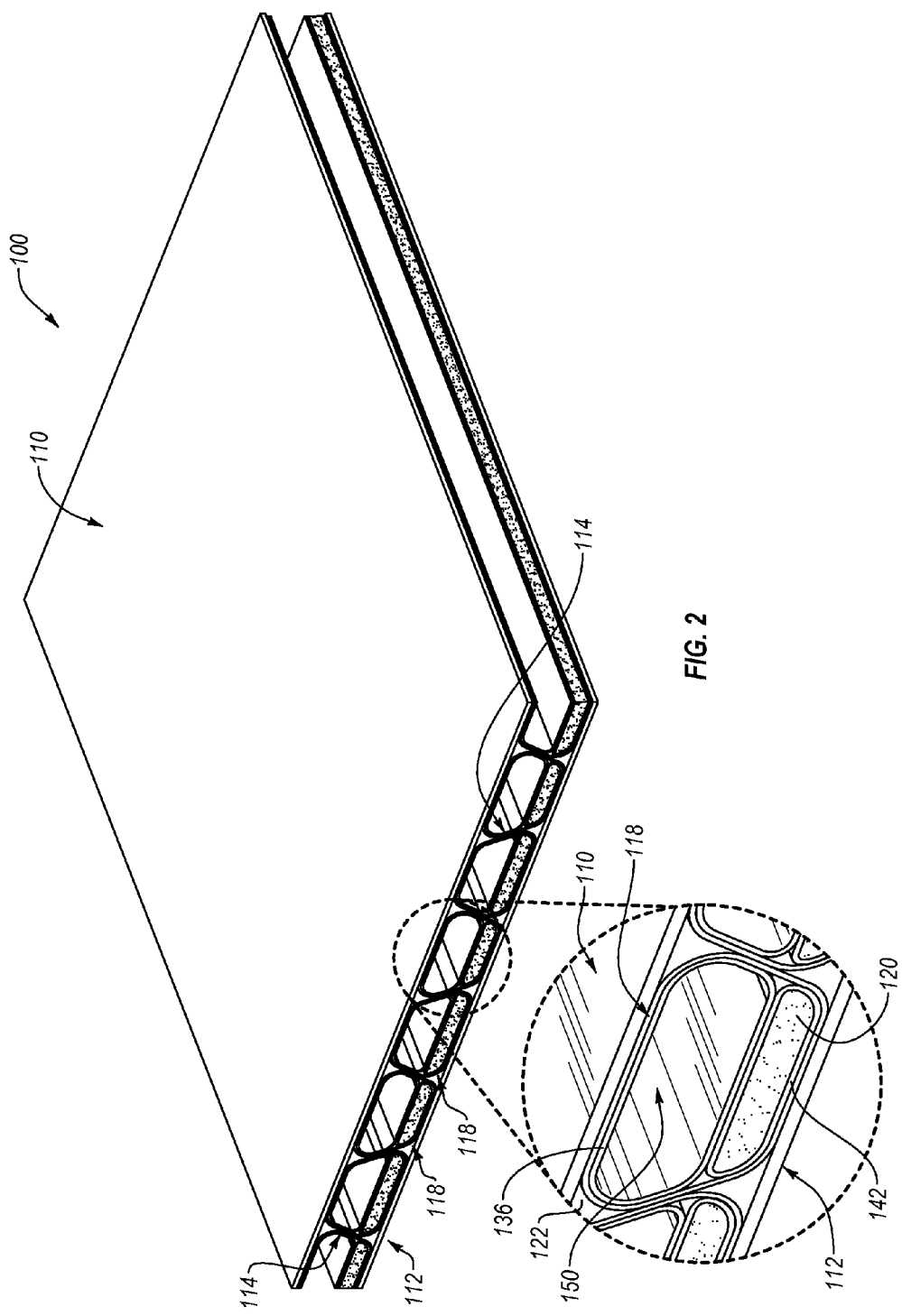
FIG. 2 is a perspective view of a fluted core panel, according to one embodiment.

Referring to FIG. 2, and according to one embodiment, the fluted core panel 100 includes a first facesheet 110, a second facesheet 112 spaced apart from the first facesheet, and webs 114 positioned between the first and second facesheets. An interior space defined between the first facesheet 110 and the second facesheet 112 is divided into individual channels or vents 150 by the webs 114. In other words, two adjacent webs 114 define each of the vents 150. The vents 150 are further defined by insulation 120 positioned in the interior space between the first facesheet 110 and the second facesheet 112. Accordingly, each vent 150 is defined between adjacent webs 114, the first facesheet 110, and the insulation 120. Like the vents 150, the insulation 120 is divided into separate pieces of insulation by the webs 114. The fluted core panel 100 may include a membrane 136 positioned between the insulation 120 and the vents 150.

In the illustrated implementation, the webs 114 are angled relative to the first and second facesheets 110, 112. Moreover, the angle of each web 114 relative to the first and second facesheets 110, 112 alternates from web to web across a width of the fluted core panel 100. The alternating angles of the webs 114 produce alternating cross-sectional shapes of the vents 150 across a width of the fluted core panel 100. For example, the cross-sectional shapes of the vents 150 alternate between a trapezoidal shape and an inverted trapezoidal shape. Although the webs 114 are angled with respect to the first and second facesheets 110, 112 in the illustrated implementation, in some embodiments, the webs 114 are not angled with respect to the first and second facesheets 110, 112, but are rather perpendicular relative to the first and second facesheets.

Figure 3:
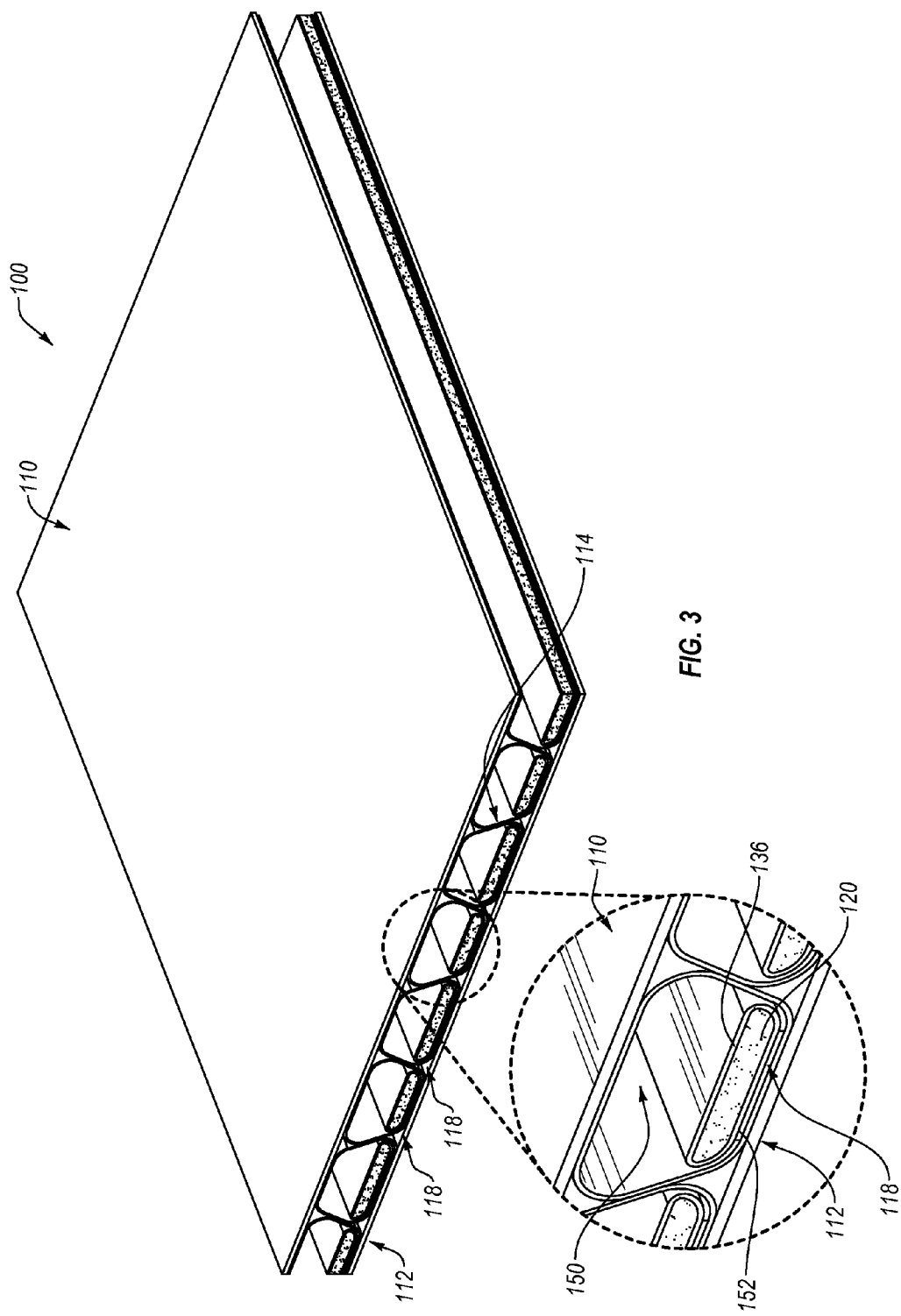
FIG. 3 is a perspective view of a fluted core panel, according to another embodiment.

Now referring to FIG. 3, and according to one embodiment, a fluted core panel 100 similar to the fluted core panel of FIG. 2 is shown. Like the fluted core panel 100 of FIG. 1, the fluted core panel of FIG. 2 includes a first facesheet, 110, a second facesheet 112, and webs 114. Additionally, the fluted core panel 100 of FIG. 3 includes vents 150, insulation 120, and a membrane 136. However, unlike the fluted core panel 100 of FIG. 2, each web 114 of the fluted core panel of FIG. 3 is defined by abutted sidewalls of adjacent annular flutes 118 positioned between the first and second facesheets 110, 112. Further, referring to FIGS. 3 and 4, each vent 150 of the fluted core panel of FIG. 3 is defined between adjacent webs 114 (e.g., opposing first sidewalls 128 of a corresponding annular flute 118), a second sidewall 130 of the corresponding annular flute, and the insulation 120. The interstitial spaces between the flutes 118 are filled with a noodle 122.

Although the fluted core panel 100 of FIGS. 2 and 3 is shown as being relatively flat, such a configuration of the fluted core panel is provided for illustrative purposes only as the fluted core panel can be shaped into any of various non-planar (e.g., curved) shapes. For example, as shown in FIG. 1, the fluted core panel 100 can be curved to form the shell of a substantially cylindrically-shaped pressure vessel.

Figure 4:
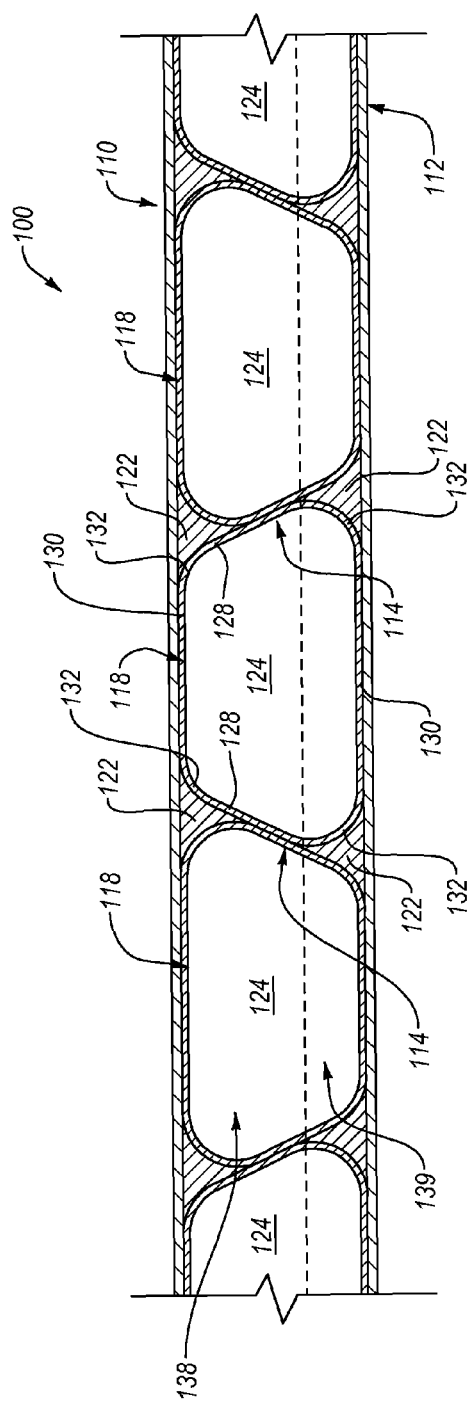
FIG. 4 is a cross-sectional side elevation view of a fluted core panel, according to one embodiment, prior to executing a method of at least partially insulating the fluted core panel.

Further details of the fluted core panel 100 of FIG. 3 are shown in cross-section in FIG. 4. Each annular flute 118 has a generally trapezoidal cross-sectional shape with the opposing first sidewalls 128 converging/diverging relative to each other and the opposing second sidewalls 130 extending parallel relative to each other. Each of the first and second sidewalls 128, 130 in the illustrated embodiment is substantially straight or planar. However, in some embodiments, the first and/or second sidewalls 128, 130 can be curved or non-planar. Defining the transition between respective first and second sidewalls 128, 130 are rounded corners or bends 132. The annular flutes 118 have bends 132 between the first and second sidewalls 128, 130 rather than sharp corners or edges due to the structural limitations of the material forming the annular flutes. However, it is recognized, in some embodiments, the annular flutes 118 may be made from a material capable of forming sharp corners or edges.

The annular flutes 118 are sandwiched between the first and second facesheets 110, 112 such that the first facesheet abuts a respective one of the second sidewalls 130 of each annular flute and the second facesheet abuts the other of the second sidewalls 130 of each annular flute. Further, the annular flutes 118 are arranged in a side-by-side manner between the first and second facesheets 110, 112 such that a first sidewall 128 of one annular flute abuts a first sidewall of the adjacent annular flute. Due to the cross-sectional shape and arrangement of the annular flutes 118, interstitial spaces may be formed between the bends 132 of adjacent annular flutes and respective first and second facesheets 110, 112. The noodles 122 fill respective interstitial spaces between the annular flutes 118 to enhance the structural integrity of the fluted core panel 100.

Referring again to FIG. 4, each annular flute 118 defines an interior space 124 defined generally between the first facesheet 110, the second facesheet 112, and adjacent webs 114. More specifically, each interior space 124 is defined between opposing second sidewalls 130 of a respective annular flute 118 and adjacent webs 114 (e.g., opposing first sidewalls 128 of the respective annular flute). Each interior space 124 can be divided into a first portion 138 and a second portion 139. The first and second portions 138, 139 are shown delineated by an imaginary dashed line in FIG. 4.

The collective or combined interior spaces 124 of the annular flutes 118 can be defined as the interior space of the fluted core panel 100.

In some implementations, the fluted core panel 100 separates an interior material containment area (e.g., the interior of a pressure vessel) from an exterior space (e.g., the environment within which a pressure vessel operates). In such implementations, the first facesheet 110 is considered an outer facesheet and the second facesheet 112 is considered an inner facesheet. Correspondingly, the second sidewall 130 abutting the first facesheet 110 is considered an outer second sidewall and the second sidewall 130 abutting the second facesheet 112 is considered an inner second sidewall. Likewise, in these implementations, the first portion 138 of each interior space 124 is considered an outer portion and the second portion 139 of each interior space is considered an inner portion. The fluted core panel 100 may form part of a pressure vessel, such as a cryogenic liquid tank for storing pressurized fluids or gas, such as cryogenic liquids, such as fuel or propellants.

According to certain embodiments, the first facesheet 110, second facesheet 112, and annular flutes 118 are made from a fibrous composite material, such as a pre-impregnated carbon fiber reinforced polymer sheets. The noodles 122 can be made from any of various materials, such as a curable material, according to any of various methods of manufacture. In other embodiments, the first facesheet 110, second facesheet 112, annular flutes 118, and noodles 122 are made from other materials as desired.

The fluted core panel 100 of FIG. 4 is a pre-formed and uninsulated fluted core panel made by any of various methods, such as, for example, those described in U.S. Pat. Nos. 7,296,769; 7,998,299; 8,815,038; and 8,834,667, and U.S. Patent Application Publication No. 2014/0363595, which are incorporated herein by reference. In one implementation, and referring to FIGS. 11 and 12, the pre-formed and uninsulated fluted core panel 100 of FIG. 4 is formed by positioning the annular flutes 118 between the first and second facesheets 110, 112 at 210. In one implementation, the annular flutes 118 are in a pre-cured state when they are positioned between the first and second facesheets 110, 112, which can also be in a pre-cured state. Alternatively, the flutes 118 are in an uncured or green state when they are positioned between the first and second facesheets 110, 112, and cured together with the first and second facesheets. Positioning the flutes 118 between the first and second facesheets 110, 112 may include inserting the flutes 118 between the first and second facesheets with the facesheets in place. Alternatively, positioning the flutes 118 between the first and second facesheets 110, 112 includes positioning the flutes on the second facesheet, without the first facesheet in place, and then laying up the first facesheet over the flutes to effectively sandwich the flutes between the facesheets.

To maintain the shape of the annular flutes 118 while positioning the annular flutes between the first and second facesheets 110, 112, and/or curing the annular flutes, the material of each annular flute may be wrapped about a rigid mandrel having a cross-sectional shape corresponding with the desired shape of the annular flute. The rigid mandrel may be made from, or have an outer surface made from, a low friction or non-stick material, such as polytetrafluoroethylene. With the material of the annular flutes 118 wrapped around the rigid mandrels, the mandrels are positioned between the first and second facesheets 110, 112 such that the annular flutes 118 abut each other in the side-by-side configuration to form the webs 114 as described above. Then, with the mandrels in place between the first and second facesheets 110, 112, the annular flutes 118, first facesheet, and second facesheet are exposed to heat to cure and bond together the annular flutes 118, first facesheet, and second facesheet at 212 to form the pre-formed and uninsulated fluted core panel 100 of FIG. 4. Prior to the curing process, the noodles 122 are positioned in the interstitial spaces between the annular flutes 118, and cured in the same or a different curing process.

After curing at 212 of the method 200, the pre-formed and uninsulated fluted core panel 100 shown in FIG. 3 is in condition to be at least partially insulated. Partial insulation of the fluted core panel 100 includes positioning spacers within respective annular flutes 118 of the pre-formed and uninsulated fluted core panel 100 at 214 of the method 200. Additionally, the method 200 includes positioning membranes 136 within respective annular flutes 118 at 216. The method 200 further includes positioning insulation within each of the annular flutes 118 such that the membrane 136 is interposed between the spacer and the insulation at 218. Further, the method 200 includes curing the membranes 136 at 230 or 240, and removing the spacer at 234.

Referring again to FIGS. 11 and 12, the steps 214, 216, 218, 234 of the method 200 can be executed according to at least a first embodiment (see, e.g., FIGS. 5-8) and a second embodiment (see, e.g., FIGS. 9 and 10) of the method. The first embodiment is associated with a negative determination at 220 of the method 200, and the second embodiment is associated with a positive determination at 220. In other words, the first embodiment is associated with a method 200 of making an insulated fluted core panel that does not use pre-formed insulation, and the second embodiment is associated with a method of making an insulated fluted core panel that does use pre-formed insulation. The decision to use insulation that is not pre-formed (e.g. foamed-in-place insulation) according to the first embodiment or to use pre-formed insulation according to the second embodiment may depend on any of various factors, such as, for example, cost, weight, and performance. Descriptions of the first and second embodiment of the method 200 are described separately below.

Figure 5:
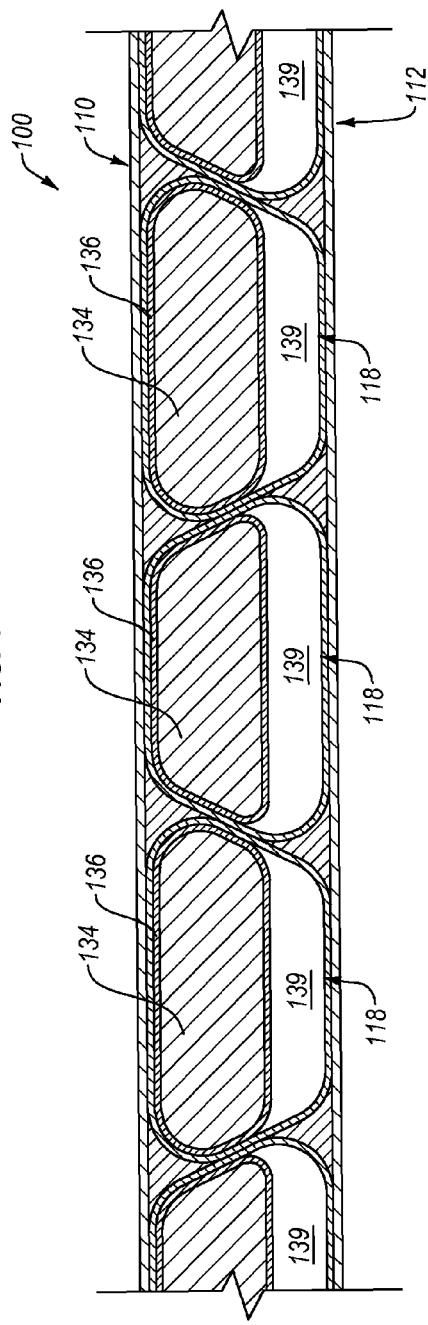
FIG. 5 is a cross-sectional side elevation view of the fluted core panel of FIG. 4 shown with a spacer and membrane positioned in an interior space of the fluted core panel, according to one embodiment.

Referring to FIG. 5, according to the first embodiment of the method 200, each spacer is a mandrel 134 having a shape corresponding to the pre-formed shape of the annular flute 118. Moreover, the mandrels 134 are positioned in the first portions 138 of the interior spaces 124 defined by the annular flutes 118. Because the annular flutes 118 are arranged in an alternating manner (e.g., alternating between inverted and non-inverted), the shapes of the first portions 138 of the interior spaces 124 also alternate in a similar manner. Accordingly, placement of the mandrels 134 in the first portions 138 of the interior spaces 124 requires the orientation of the mandrels 134 to alternate in the same manner. Each mandrel 134 can be a solid mandrel made from a substantially rigid material. More specifically, in one implementation, each mandrel 134 is made from a low friction or non-stick material, such as polytetrafluoroethylene, with a relatively high melting temperature (e.g., higher than a cure temperature of the membranes 136 as described below).

According to the first embodiment, positioning the membranes 136 within the annular flutes 118 at 216 includes wrapping each mandrel 134 with a respective membrane at 222 before positioning the mandrels within the first portions 138 of the interior spaces 124 at 214. In other words, after each mandrel 134 is wrapped with a respective membrane 136, each mandrel and membrane assembly is positioned within the first portion 138 of a respective interior space 124.

Each membrane 136 may completely envelope the corresponding mandrel 134. For example, end portions of the membrane 136 may overlap each other or abut each other such that an entirety of the mandrel 134 is covered. However, in some implementations, a portion of the mandrel 134 may not be covered by the membrane 136. Nevertheless, desirably, at least the surface of the mandrel 134 facing the second portion 139 of the interior space 124 is covered by the membrane 136. Each mandrel 134 is sized to complement the shape of the first portions 138 of the interior spaces 124 such that each membrane 136 may uniformly abut the interior surface of the annular flute 118 defining the first portion of the interior space. In this manner, when cured at 230, each membrane 136 forms consistent bond to the annular flute 118 along the interior surface of the annular flute.

The membranes 136 are made from a sheet of semi-permeable material. In some implementations, the semi-permeable material allows for the passage of some particles, such as liquid and gas molecules, but prevents the passage of other particles, such as pieces of the insulation 120. In one implementation, the membrane 136 is made from a composite material, such as a graphite-epoxy fabric material. The composite material may have a relative low volume-fraction of epoxy that is wicked into a fibrous fabric material in a manner that leaves small open spaces to facilitate breathability of the composite material. According to some embodiments, the semi-permeable material can be made of any of various materials that has at least 50 holes per square inch with each hole being less than a few thousandths of an inch in diameter.

Figure 11:
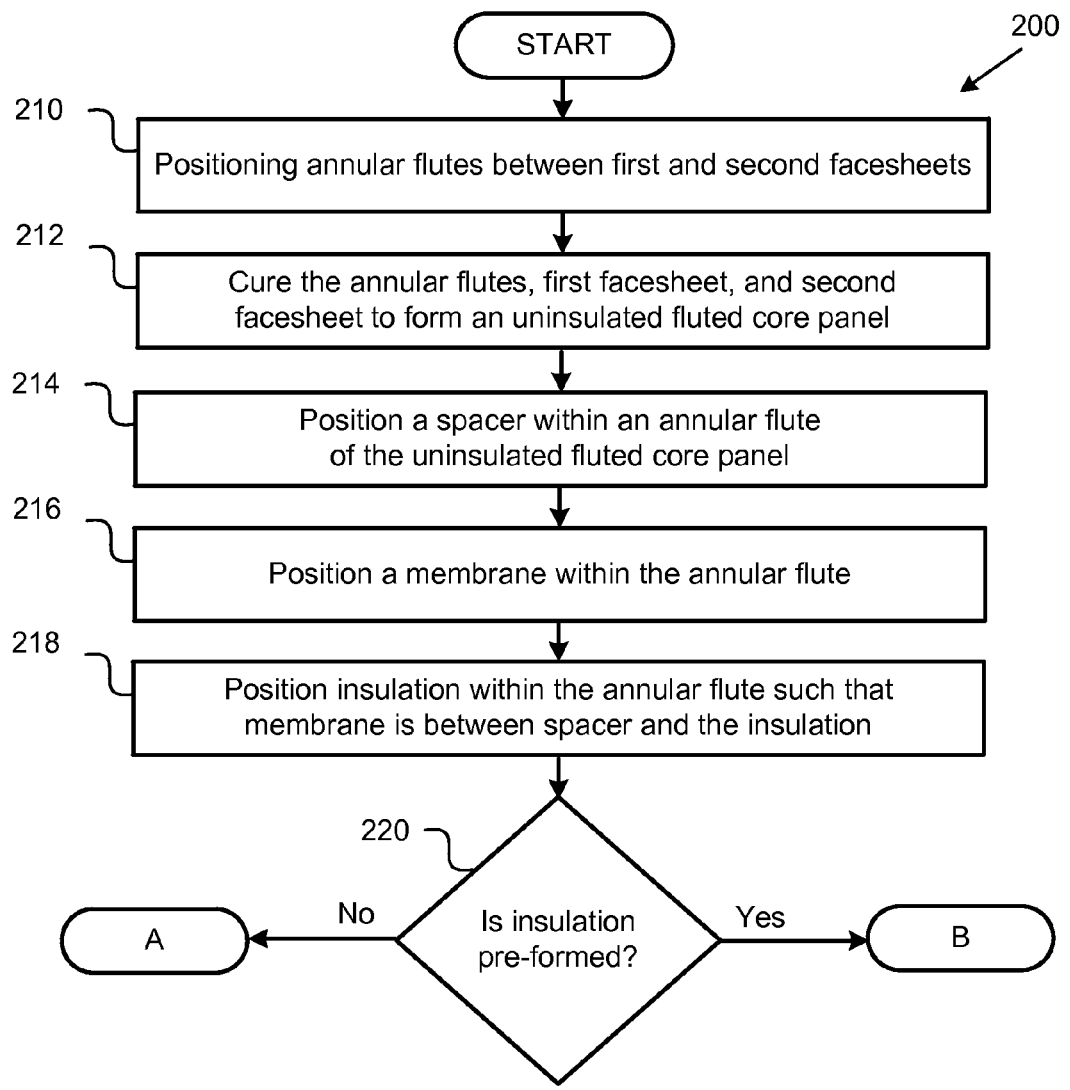
FIG. 11 is a first portion of a block diagram illustrating one embodiment of a method of insulating an interior space of a fluted core panel.
Figure 12:
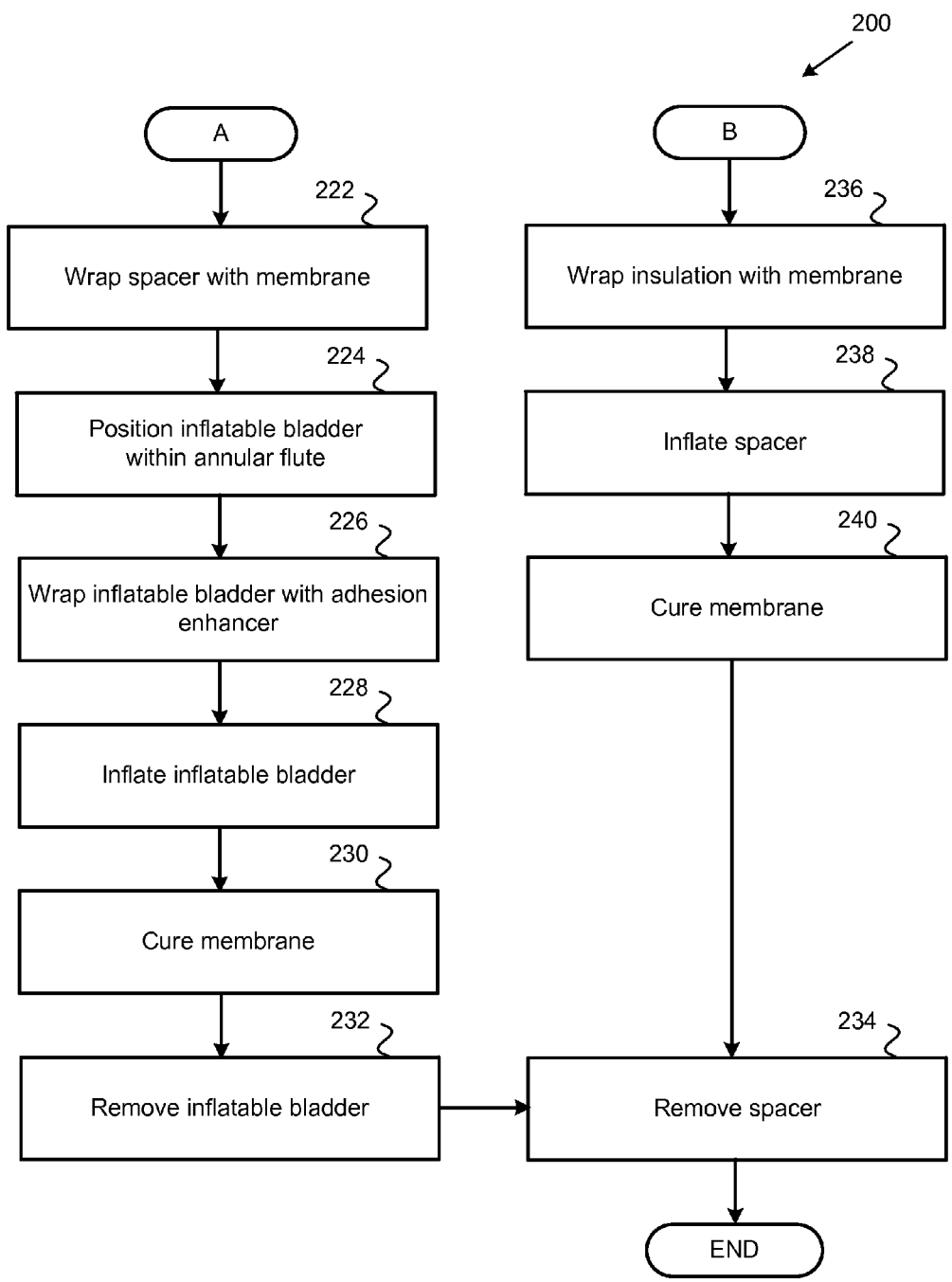
FIG. 12 is a second portion of the block diagram of the method of insulating an interior space of a fluted core panel, according to one embodiment.

Referring to FIGS. 6, 11, and 12, the first embodiment of the method 200 also includes positioning inflatable bladders 140 within each of the annular flutes 118 at 224. More specifically, the inflatable bladders 140 are positioned within the second portions 139 of the interior spaces 124. The inflatable bladders 140 are positioned within the second portions 139 of the interior spaces 124 while the mandrels 134 and membranes 136 are positioned within the first portions 138 of the interior spaces. Each inflatable bladder 140 is made from a flexible material, such as a polymer (e.g., rubber or plastic), and defines a hollow interior 160. In some implementations, each inflatable bladder 140 is a tube-like component where the hollow interior 160 is the central channel defined by the tube-like component.

In some implementations, prior to positioning the inflatable bladders 140 within the annular flutes 118, the method 200 includes wrapping each inflatable bladder with an adhesion enhancer 142 at 226. Each adhesion enhancer 142 may completely envelope the corresponding inflatable bladder 140. For example, end portions of the adhesion enhancer 142 may overlap each other or abut each other such that an entirety of the inflatable bladder 140 is covered. However, in some implementations, a portion of the inflatable bladder 140 may not be covered by the adhesion enhancer 142.

The adhesion enhancers 142 are each made from a sheet of composite material that enhances the adhesion between the membranes 136 and annular flutes 118, and the insulation 120. In some implementations, each adhesion enhancer 142 is a dry glass mat that is adhered to the annular flutes 118 with a wet adhesive that at least partially saturates the glass mat. When dried, a portion of the glass fibers of the adhesion enhancer 142 protrude from the adhesive. The protruded glass fibers act as anchors for the insulation 120 to retain the insulation in place as will be described in more detail below.

With the mandrels 134 and membranes 136 positioned in the first portions 138 of the interior spaces 124, and the inflatable bladders 140 and adhesion enhancers 142 positioned in the second portions 139 of the interior spaces, the inflatable bladders 140 are inflated at 228. The inflatable bladders 140 can be inflated by introducing a gas or liquid into the hollow interior 160. In one implementation, the gas is air. According to another implementation, the liquid is water or oil. The gas or liquid fills and pressurizes the hollow interior 160. In some implementations, pressurization of the hollow interiors 160 expands the inflatable bladders 140. The pressurized hollow interiors 160 exert an outwardly directed pressure onto respective adhesion enhancers 142, which correspondingly exert an outwardly directed pressure onto the sidewalls 128, 130 of respective annular flutes 118 and respective membranes 136. The outwardly directed pressure applied by the inflatable bladders 140 effectively compresses the adhesion enhancers 142 against the sidewalls 128, 130 and membranes 136, and compresses the membranes against the mandrels 134. The compression of the adhesion enhancers 142 and membranes 136 in this manner conforms the shape of the adhesion enhancers and membranes 136 to the shape of the second portion 139 of the interior space 124 defined by the mandrel 134 and sidewalls 128, 130 of the annular flutes 118.

Although not shown, each of the inflatable bladders 140 receives the gas or liquid from a plenum where the gas or liquid is stored at positive pressure. Each of the inflatable bladders 140 may receive gas or liquid from a separate plenum. Alternatively, in some implementations, a single plenum supplies gas or liquid to the inflatable bladders 140 concurrently.

While the inflatable bladders 140 are inflated at 228 to retain the adhesion enhancers 142 and membranes 136 against the mandrel 134 and sidewalls 128, 130 of the annular flutes 118, the method 200 includes curing the membranes 136 at 230. Additionally, in certain implementations where adhesion enhancers 142 are utilized as described above, curing the membranes 136 at 230 also includes curing the adhesion enhancers 142. Curing the membranes 136 and adhesion enhancers 142 includes exposing the fluted core panel 100, with the mandrels 134, membranes 136, inflated inflatable bladders 140, and adhesion enhancers 142, to heat 144 until the temperatures of the membranes 136 and adhesion enhancers 142 reach respective cure temperatures. In some implementations, for example, the cure temperatures are between about 250° F. and about 350° F. Heating the membranes 136 and adhesion enhancers 142 to the respective cure temperatures hardens the epoxy (e.g., resin) or matrix material of the membranes and adhesion enhancers to permanently set the fibers suspended in the epoxy or matrix material in place. Such curing also bonds the membranes 136 to the annular flutes 118 and the adhesion enhancers 142 to the membranes and annular flutes 118. It is recognized that the materials of the mandrels 134 and inflatable bladders 140 are chosen such that the properties and structure of the spacers and inflatable bladders are not adversely affected at the cure temperatures of the membranes 136 and adhesion enhancers 142.

After the membranes 136 and adhesion enhancers 142 are cured at 230, the inflatable bladders 140 are removed at 232. Because the membranes 136 and adhesion enhancers 142 are set following the curing at 230, the membranes 136 and adhesion enhancers 142 retain their cured shape during and after removal of the inflatable bladders 140. With the inflatable bladders 140 removed, the portion of the second portions 139 of the interior spaces 124 previously occupied by the inflatable bladders is an open space defined by the adhesion enhancers 142.

Referring to FIG. 6, with the mandrels 134 in place in the first portions 138 of the interior spaces 124, the open space defined within the adhesion enhancers 142 is filled with insulation 120. Accordingly, in the first embodiment of the method 200, positioning insulation 120 within the annular flute at 218 includes filling the open spaces defined within the adhesion enhancers 142 with insulation. In one implementation, filling the open spaces within the adhesion enhancers 142 includes injecting fluid insulation into the open spaces. As the insulation 120 is injected into the open spaces, the insulation expands to fill the open spaces. The expansion of the insulation 120 in a confined space can generate significant pressures, such as up to 30 psi, which can be controlled by adjusting the ratio of the constituents of the insulation to achieve a desired density of the insulation. Therefore, to prevent the expansion of the insulation 120 from damaging or misshaping the membrane 136, the mandrel 134 remains in place as a stop while the insulation 120 is injected into the open spaces at 218. As the insulation 120 expands within the open spaces, the insulation envelopes the glass fibers protruding from the adhesion enhancers 142. In other words, the glass fibers protrude into the insulation 120, which act to retain the insulation within the adhesion enhancers 142, thereby retaining the insulation within the second portions 139 of the interior spaces 124.

Further, in some embodiments, the thickness of the open spaces defined within the adhesion enhancer 142 are uniform or the same. Accordingly, the thickness of the insulation 120 positioned within the open spaces also is uniform or the same. The uniformity of the thickness of the open spaces can be controlled by ensuring the thicknesses of the mandrels 134, membranes 136, and adhesion enhancers 142 are uniform. In some implementations, the thickness of the insulation 120 is between about 0.125 inches (3.175 mm) and about 2 inches (50.8 mm). In one implementation, the thickness of the insulation is about 0.250 inches (6.35 mm).

According to one implementation, the insulation 120 is made from the combination of first and second parts. While isolated from each other, the first and second parts are non-reactive. However, upon combining them together, the first and second parts react with each other to expand and form into the insulation 120. The first and second parts can be combined in the open spaces within the adhesion enhancers 142 using separate supply tubes. The supply tubes are slowly retracted from the open spaces while introducing the first and second parts of the insulation 120 into the open spaces. The rate of retraction of the supply tubes is based on the flow rate of the first and second parts of the insulation 120 into the open spaces, as well as the reaction time of the first and second parts to form the insulation 120. Generally, the supply tubes are retracted at a rate that is slow enough to allow the insulation 120 to properly form within the open spaces, but fast enough to prevent the insulation 120 from forming about and obstructing the flow of the first and second parts from the tube. Although not shown, multiple sets of supply tubes may be concurrently positioned within and retracted from the open spaces to concurrently inject insulation into the open spaces.

The insulation 120 can be any of various insulating materials known in the art, such as polyurethane foams and polyisocyanurate foams.

Figure 8:
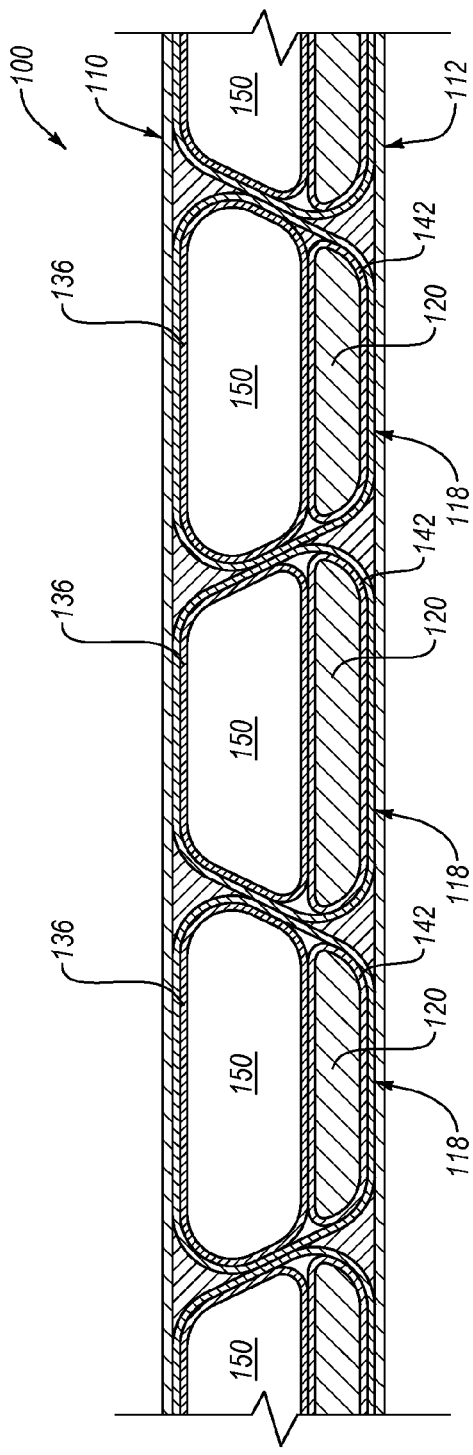
FIG. 8 is a cross-sectional side elevation view of the fluted core panel of FIG. 7 shown with the spacer removed from the interior space of the fluted core panel, according to one embodiment.

Referring to FIG. 8, after the insulation 120 has expanded and dried in the open spaces defined by the adhesion enhancers 142, the method 200 includes removing the mandrels 134 from the first portions 138 of the interior spaces 124. Because the membranes 136 and adhesion enhancers 142 are set following the curing at 230, and the insulation 120 has stopped expanding, the membranes 136 and adhesion enhancers 142 retain their cured shape during and after removal of the mandrels 134. With the mandrels 134 removed, the portion of the first portions 138 of the interior spaces 124 previously occupied by the spacers is an open space. The open spaces in the first portions 138 created by the removal of the mandrels 134 are defined as the vents 150, which extend a length of the fluted core panel 100. The fluted core panel 100 shown in FIG. 8 is defined as an insulated fluted core panel with a layer of insulation 120 on the inner side of the fluted core panel and vents 150 on the outer side of the fluted core panel.

In some embodiments where the fluted core panel 100 is used to form a cryogenic liquid fuel tank, the tank undergoes a drying or purging process prior to launch of a vehicle fueled by fuel in the tank. Composite structures, such as pressure vessel 10, tend to absorb moisture from atmospheric humidity and may come to an equilibrium moisture content dependent on the average humidity level of the environment in which the composite structures are exposed. Exposure to thermal cycles below the freezing point of water may cause progressive damage from the expansion of ice trapped in small voids within the composite structures. To prevent or reduce such progressive damage, composite structures can be dried prior to experiencing thermal cycles below the freezing point of water.

According to certain implementations, the drying process includes introducing (e.g., via forced circulation) the flow of a dry gas, such as air, nitrogen, and helium, through the vents 150. The drying process induces the flow of moisture from the insulation 120, and other locations between the first and second facesheets 110, 112, into the vents 150 by flowing dry gas through the vents 150. The moisture is able to flow from the insulation 120 and into the vents 150 via the semi-permeable membranes 136. According to one embodiment, the insulation 120 within the fluted core panel 100 is positioned between the vents 150 and the interior of the tank. The insulation 120 keeps the purge gasses flowing through the vents 150 during the venting or purging process relatively warm, which may facilitate the use of less-expensive purge gasses. Without insulation 120, a portion of the purge gasses may be liquefied to create a two-phase flow through the vents 150, which can be difficult to control. Additionally, the insulation 120 reduces the heat transfer between the purge gasses in the vents 150 and the material (e.g., fuel) stored in the tank, which can lessen fuel boil-off and allow more precise control of the characteristics (e.g., density) of the fuel.

Figure 9:
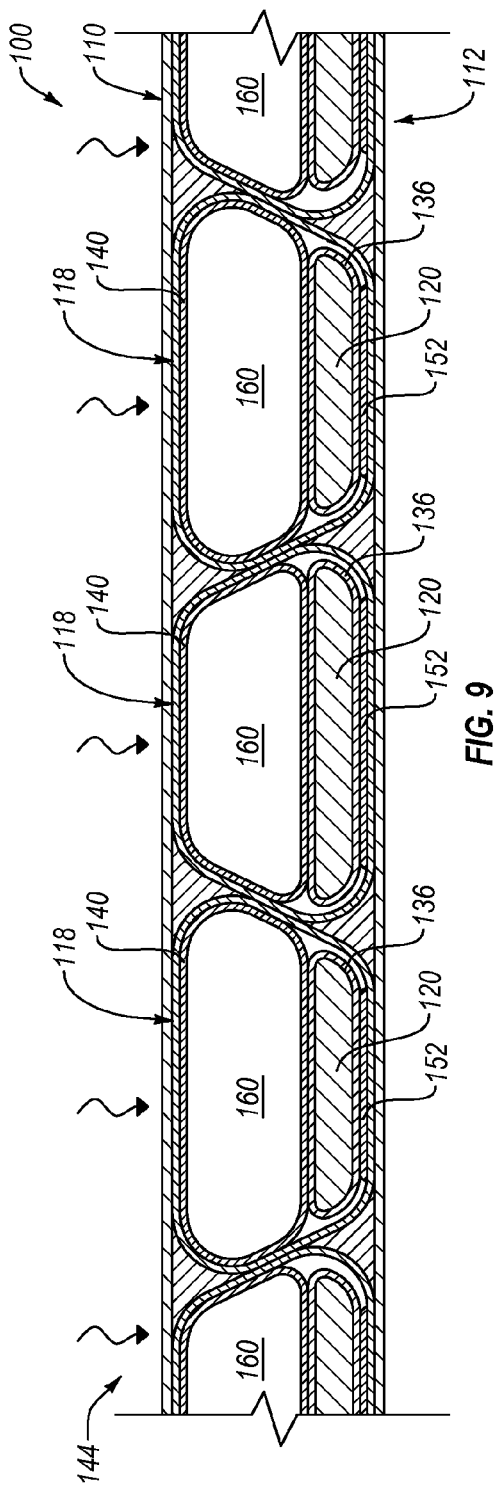
FIG. 9 is a cross-sectional side elevation view of the fluted core panel of FIG. 4 shown with a spacer and membrane positioned in an interior space of the fluted core panel, according to one embodiment.

Referring to FIGS. 9, 11, and 12, according to the second embodiment of the method 200, each spacer positioned within the annular flute of the uninsulated fluted core panel (see, e.g., FIG. 4) at 214 is an inflatable bladder 140. Each inflatable bladder 140 of FIG. 9 can be similar to the inflatable bladders of FIG. 6. However, because the inflatable bladders 140 of the second embodiment are positioned within the first portions 138 of the interior spaces 124, the inflatable bladders associated with the second embodiment may be bigger than those associated with the first embodiment. However, in some embodiments, the inflatable bladders 140 associated with FIGS. 6 and 9 can be similarly configured and sized.

The second embodiment of the method 200 also includes wrapping insulation 120 that is pre-formed with the membrane 136 at 236. The pre-formed insulation 120 may include multiple strips of pre-formed insulation, such that each strip of pre-formed insulation is wrapped with a separate membrane 136. Each membrane 136 may completely envelope the corresponding strip of pre-formed insulation. For example, end portions of the membrane 136 may overlap each other or abut each other such that an entirety of the strip of pre-formed insulation is covered. However, in some implementations, a portion of the strip of pre-formed insulation may not be covered by the membrane 136. Nevertheless, desirably, at least the surface of the strip of pre-formed insulation facing the first portion 138 of the interior space 124 is covered by the membrane 136. Positioning the insulation 120 within the annular flute 118 at 218 includes positioning a strip of pre-formed insulation with a membrane 136 wrapped thereabout into each of the second portions 139 of the interior spaces 124.

Prior to wrapping the pre-formed insulation 120 at 236 of the method 200, the pre-formed insulation is formed using any of various techniques. According to one embodiment, a sheet of insulation having a uniform thickness is cut or machined into strips with widths sized to fit within respective second portions 139 of the interior space 124. The width of the strips may alternate in a side-to-side manner within the fluted core panel 100 to correspond with the alternating orientation of the annular flutes 118. In yet some embodiments, the strips of the pre-formed insulation 120 may be made using dies or molds.

With the inflatable bladders 140 positioned in the first portions 138 of the interior spaces 124 and pre-formed insulation 120, each wrapped with the membrane 136, positioned in the second portions 139 of the interior spaces 124, the method 200 includes inflating the spacers (e.g., inflatable bladders 140) at 238 and curing the membranes 136 at 240. The inflatable bladders 140 can be inflated by introducing a gas or liquid into the hollow interior 160 of each inflatable bladder. The pressurized hollow interiors 160 exert an outwardly directed pressure onto respective membrane-wrapped strips of insulation 120. The outwardly directed pressure applied by the inflatable bladders 140 effectively ensures the membranes 136 are pressed against the strips of pre-formed insulation 120 and against the inner sidewall 130 of the annular flutes 118. While the inflatable bladders 140 are inflated, the membranes 136 are cured at 240 by exposing the fluted core panel 100 to heat 144 until the temperature of the membranes reaches a cure temperature of the membranes. Curing the membranes at 240 bonds the membranes 136 to the annular flutes 118 and bonds the insulation 120 to the membranes, such that the insulation is effectively indirectly bonded to the annular flutes 118 in the second portions 139 of the interior spaces 124. It is recognized that the material of the pre-formed insulation 120 and inflatable bladders 140 are chosen such that the properties and structure of the insulation and inflatable bladders are not adversely affected at the cure temperatures of the membranes 136.

After the membranes 136 are cured at 240, the spacers (e.g., inflatable bladders 140) are removed at 234. With the inflatable bladders 140 removed, the portion of the first portions 138 of the interior spaces 124 previously occupied by the inflatable bladders is an open space. The open spaces in the first portions 138 created by the removal of the mandrels 134 define the vents 150.

According to some implementations of the second embodiment of the method 200, a film adhesive 152 or preform is positioned in the second portion 139 of respective interior spaces 124 prior to inflating the inflatable bladders 140. Each film adhesive 152 is positioned between a respective membrane-wrapped strip of insulation 120 and the inner sidewall 130 of a respective annular flute 118. After the inflatable bladders 140 are inflated, the outwardly directed pressure applied by the inflatable bladders 140 effectively ensures the membrane-wrapped strips of insulation 120 are pressed against the film adhesives 152 and the film adhesives are in turn pressed against the inner sidewall 130 of the annular flutes 118. With the bladders 140 inflated, the film adhesives 152 are cured when the membranes 136 are cured at 240. The film adhesives 152 promote the adhesion of the membrane-wrapped strips of insulation 120 to the interior surface of the annular flutes 118. In some implementations, each of the film adhesives 152 is a sheet of fabric adhesive that is activated by heating the adhesive, which is formed about a fabric sheet. However, in certain implementations, the film adhesives 152 are sheets or layers of adhesive material with randomly oriented fiber mat carriers or without carriers.

Figure 10:
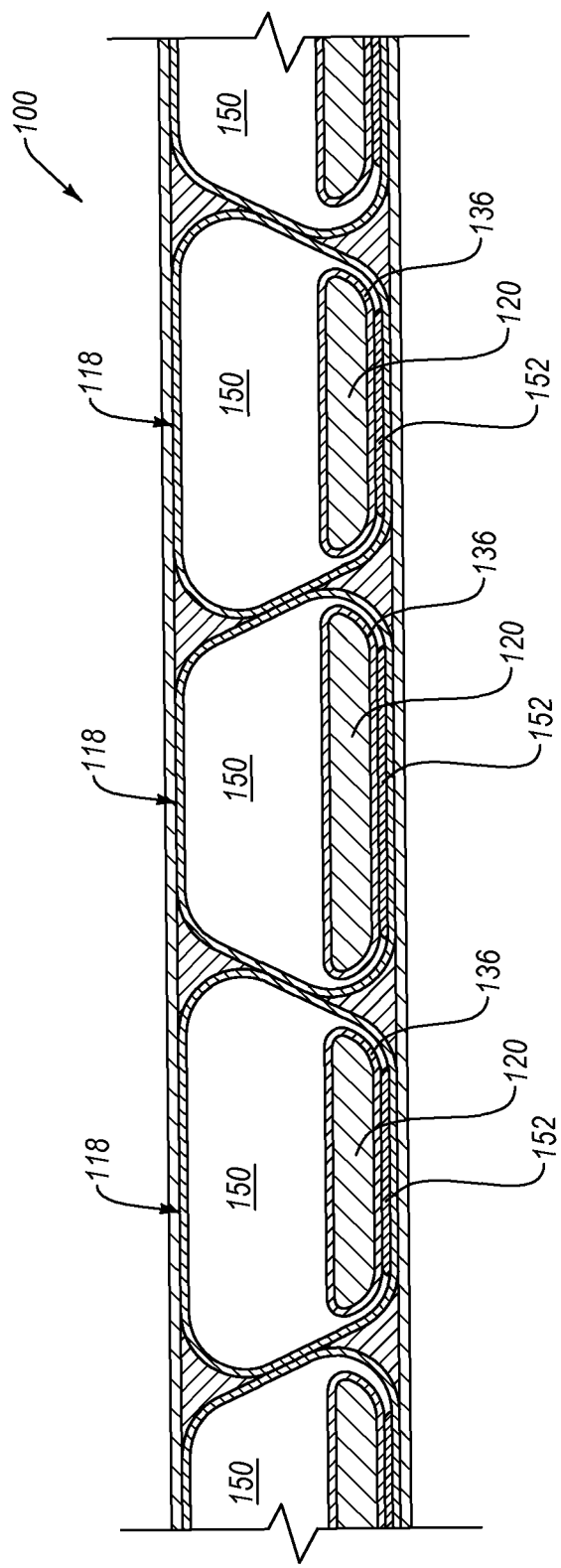
FIG. 10 is a cross-sectional side elevation view of the fluted core panel of FIG. 9 shown with the spacer removed, according to one embodiment.

The strips of pre-formed insulation 120 shown in FIGS. 9 and 10 can have any of various cross-sectional shapes. For example, as shown, the strips of pre-formed insulation 120 have rounded edges to facilitate the wrapping of membranes 136 about the insulation, as well as to better complement the shape of the annular flutes 118 defining the second portions 139. In the illustrated embodiment, lateral gaps exist between the membrane-wrapped insulation 120 and the sidewalls 128 of the annular flutes 118. However, in other embodiments, the cross-sectional shapes of the strips of pre-formed insulation 120 can more closely complement the shape of (e.g., nestably engage) the annular flutes 118 defining the second portions 139 such that no lateral gaps exist between the membrane-wrapped insulation and the sidewalls 128 of the annular flutes.

The inflatable bladders 140, pre-formed insulation 120 with the membrane 136, and film adhesives 152 can be positioned within the annular flutes 118 in separate operations at different times. However, in some implementations, two or more of the inflatable bladders 140, pre-formed insulation 120 with the membrane 136, and film adhesives 152 are pre-assembled or pre-stacked prior to insertion into the annular flutes 118 and inserted into the annular flutes in the same operation at the same time. For example, an entire pre-assembly of two or more of the inflatable bladders 140, pre-formed insulation 120 with the membrane 136, and film adhesives 152 can be drawn together into and through an annular flute 118 via a cord or cable that previously has been threaded down the length of the annular flute.

Insulating only a portion (e.g., second portion 139 or inner portion) of the interior space 124 defined by a flute 118 can provide several advantages over insulating the entire interior space. For example, as described above, the portion (e.g., first portion 138 or outer portion) of the interior space 124 without insulation can be used as a vent for the purging of gaseous or liquid materials from the fluted core panel 100 or a structure (e.g., a pressurized tank) defined by the fluted core panel. Further, the gap created by the portion of the interior space 124 without insulation provides at least some insulating effect. Additionally, a weight savings is gained by insulating only a portion of the interior space 124.

The schematic flowchart diagrams and/or schematic block diagrams in the Figures illustrate the architecture, functionality, and operation of possible implementations of apparatuses, systems, and methods according to various embodiments of the present disclosure. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented in a manual or autonomous manner.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of partially insulating an interior space of a pre-formed fluted core panel, the fluted core panel comprising a first facesheet, a second facesheet spaced apart from the first facesheet, and webs between the first facesheet and second facesheet, the interior space defined between the first facesheet, the second facesheet, and adjacent webs, the method comprising:
   positioning a spacer in a first portion of the interior space;
   positioning a membrane between the spacer and a second portion of the interior space;
   positioning insulation in the second portion of the interior space;
   pressing the membrane against the spacer;
   curing the membrane; and
   removing the spacer from the first portion of the interior space.

2. The method of claim 1, wherein the membrane is cured while the membrane is pressed against the spacer.

3. The method of claim 1, further comprising positioning an inflatable bladder in the interior space, and wherein pressing the membrane against the spacer comprises inflating the inflatable bladder.

4. The method of claim 3, wherein the spacer comprises a mandrel.

5. The method of claim 4, further comprising wrapping the mandrel with the membrane.

6. The method of claim 4, further comprising removing the inflatable bladder from the interior space, and wherein positioning insulation in the second portion of the interior space comprises injecting insulation into the second portion of the interior space after the inflatable bladder is removed from the interior space, after the membrane is cured, and before the mandrel is removed.

7. The method of claim 3, further comprising wrapping the inflatable bladder with an adhesion enhancer, and wherein curing the membrane comprises curing the adhesion enhancer.

8. The method of claim 7, wherein the adhesion enhancer comprises glass fibers suspended in a matrix.

9. The method of claim 3, wherein the spacer comprises the inflatable bladder.

10. The method of claim 9, further comprising wrapping the insulation with the membrane.

11. The method of claim 10, wherein the insulation is wrapped by the membrane before the membrane is positioned between the spacer and the second portion of the interior space and before the insulation is positioned in the second portion of the interior space.

12. The method of claim 10, wherein the insulation is hardened before enveloping the insulation with the membrane and before positioning the insulation in the second portion of the interior space.

13. The method of claim 9, further comprising applying an adhesive layer onto the membrane.

14. The method of claim 9, wherein pressing the membrane against the spacer comprises inflating the inflatable bladder.

15. The method of claim 1, wherein the membrane is made from a semi-permeable material.

16. The method of claim 1, wherein curing the membrane bonds the membrane to the insulation.

17. A method of partially insulating interior spaces of a pre-formed fluted core panel, the fluted core panel comprising a first facesheet, a second facesheet spaced apart from the first facesheet, and webs between the first facesheet and second facesheet, the interior spaces defined between the first facesheet, the second facesheet, and respective adjacent webs, the method comprising:
- positioning one of a plurality spacers in a first portion of each of the interior spaces;
- positioning one of a plurality of membranes between the spacer and a second portion of each of the interior spaces;
- positioning insulation in the second portion of each of the interior spaces;
- concurrently pressing the membranes against the spacers;
- concurrently curing the membranes; and
- removing the spacers from the first portions of the interior spaces.

18. The method of claim 17, further comprising positioning one of a plurality of inflatable bladders in each of the interior spaces, and wherein concurrently pressing the membranes against the spacers comprises concurrently inflating the inflatable bladders using a single plenum.

19. The method of claim 17, wherein the insulation in the second portions of the interior spaces have the same uniform thickness.

20. A method of making a fluted core panel, the method comprising:
- positioning annular flutes between a first facesheet and a second facesheet, wherein:
  - each annular flute comprises opposing first sidewalls and opposing second sidewalls;
  - each annular flute comprises an interior space defined between the opposing first sidewalls and opposing second sidewalls of the annular flute;
  - each first sidewall abuts a first sidewall of an adjacent flute to form a web extending between the first facesheet and the second facesheet; and
  - each second sidewall abuts one of the first facesheet and the second facesheet;
- curing the annular flutes, first facesheet, and second facesheet to form an uninsulated fluted core panel;
- positioning a spacer in a first portion of the interior space of at least one annular flute;
- positioning a membrane between the spacer and a second portion of the interior space of the at least one annular flute;
- positioning insulation in the second portion of the interior space of the at least one annular flute;
- pressing the membrane against the spacer;
- curing the membrane; and
- removing the spacer from the first portion of the interior space of the at least one annular flute.

* * * * *